Sept. 8, 1959 — W. M. YOUNG — 2,902,953
SUBSOIL INJECTOR
Filed March 20, 1956 — 2 Sheets-Sheet 1
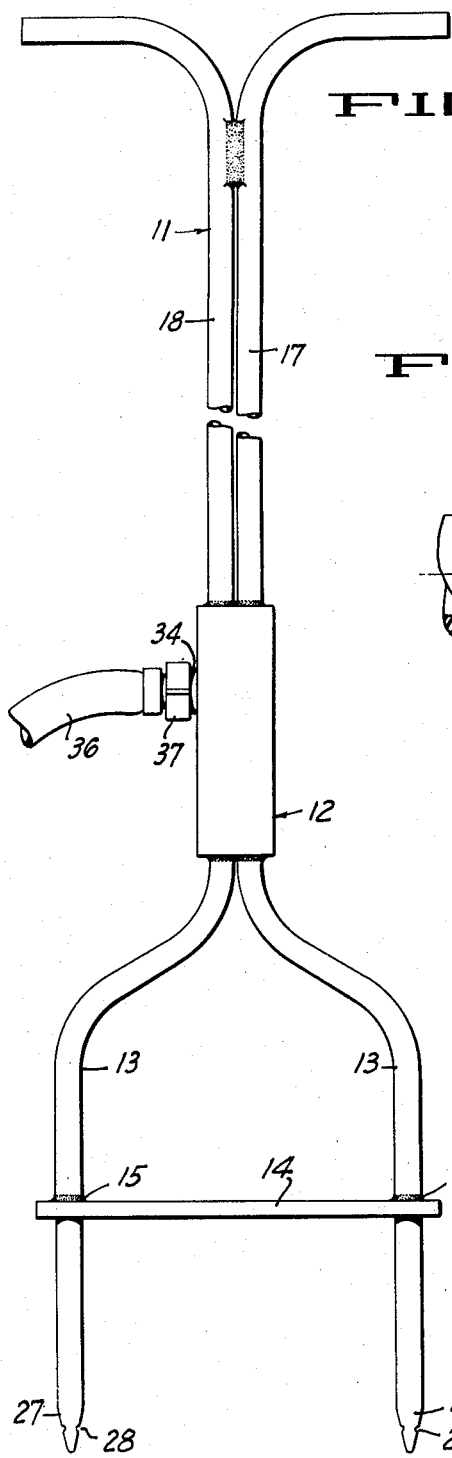
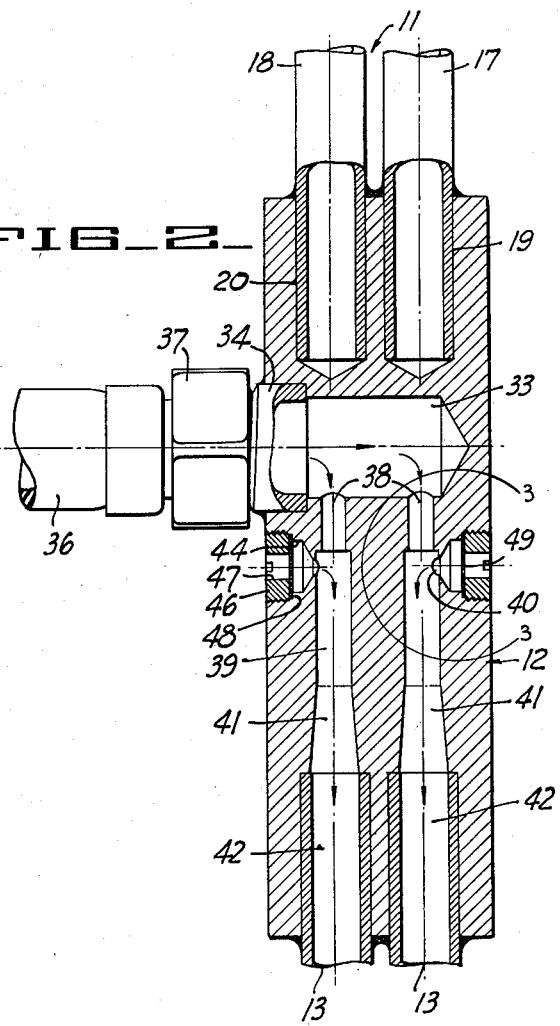
INVENTOR.
William M. Young
BY
ATTORNEYS Sept. 8, 1959 W. M. YOUNG 2,902,953
SUBSOIL INJECTOR
Filed March 20, 1956 2 Sheets-Sheet 2
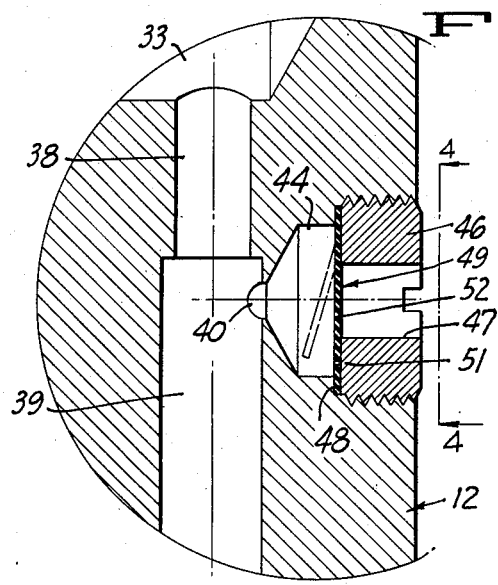
FIG_3_
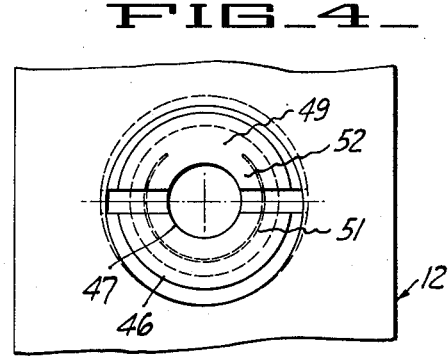
FIG_4_
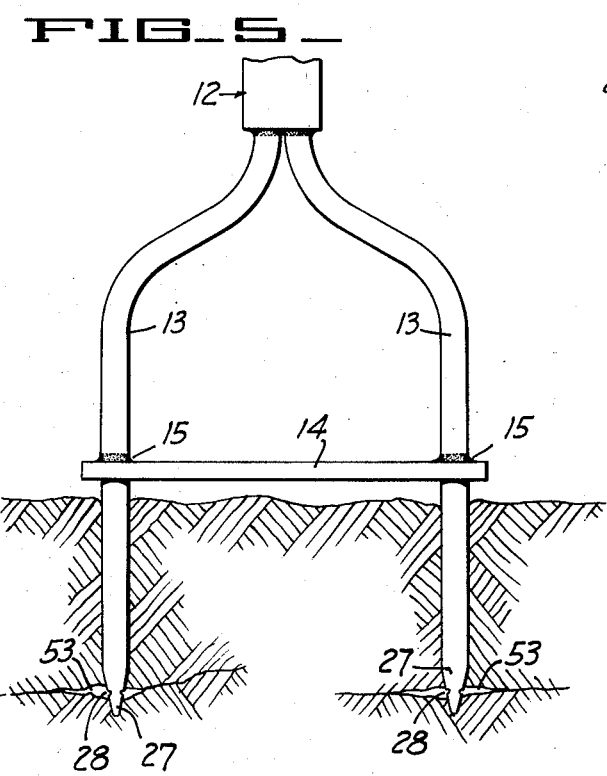
FIG_5_
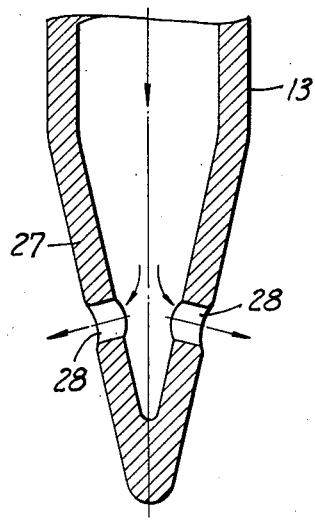
FIG_6_
INVENTOR.
William M. Young
BY
ATTORNEYS United States Patent Office 2,902,953
Patented Sept. 8, 1959

2,902,953
SUBSOIL INJECTOR

William M. Young, Redwood City, Calif.

Application March 20, 1956, Serial No. 572,667

5 Claims. (Cl. 111—7.1)

This invention relates generally to soil conditioning apparatus and more particularly to apparatus for aerating and/or fertilizing soil a distance below the surface.

Traffic and watering cause compaction of soil. When the soil is compacted, the roots cannot obtain sufficient oxygen to sustain proper plant growth. It therefore becomes necessary to aerate the soil a distance below the surface. In certain instances it may also be desirable to fertilize and add soil conditioners in the vicinity of the roots.

Prior art apparatus for aerating, fertilizing and conditioning soil are of many types. Certain of these devices mechanically improve the soil. The simpler merely punch holes in the soil. Others serve to remove a plug of soil to allow the air to penetrate or diffuse into the soil. Still other devices are adapted to introduce air under pressure into the soil where it causes fissures or breaks loosening the soil and providing oxygen for the roots. These latter devices are relatively expensive, requiring a compressor to supply the air at the required pressure.

It is an object of the present invention to provide an improved soil conditioning apparatus.

It is another object of the present invention to provide a soil conditioning apparatus which serves to aerate the soil and which is operated by a low pressure fluid.

It is another object of the present invention to provide a soil conditioning apparatus which is operated by tap water and which includes aspirating means for introducing air, fertilizer or soil conditioners into the water stream.

It is still a further object of the present invention to provide apparatus of the above character which is relatively simple, which is inexpensive to manufacture, and which does not require expensive auxiliary equipment.

These and other objects of the invention will become more apparent from the following description read in conjunction with the accompanying drawings.

Referring to the drawings:

Figure 1 is a front elevational view of one embodiment of my soil conditioning apparatus;

Figure 2 is an enlarged sectional view showing the main body assembly;

Figure 3 is an enlarged view taken along the line 3—3 of Figure 2;

Figure 4 is a view taken along the line 4—4 of Figure 3;

Figure 5 is a view showing the tines applied to the soil; and

Figure 6 is an enlarged view of the tapered tine showing the openings for the introduction of air, fertilizer and soil conditioner into the soil.

Referring to Figure 1, the apparatus comprises generally a suitable handle 11, a body 12 and tines 13 which are adapted to be inserted into the ground. A pressure bar 14 may be suitably attached to the tines, for example by brazing 15. The bar 14 provides means for applying pressure to the tines for insertion into the soil.

Handle 11 may be of any suitable construction and is suitably secured to the body 12. Means may be disposed at the end of the handle for grasping the same. The handle illustrated, by way of example, comprises a pair of L-shaped rods 17 and 18 which are accommodated within the bores 19 and 20 (Figure 2) and suitably affixed to the body.

One or more hollow tines 13 are suitably affixed to the other end of the body. The lower end of the tines 27 may be tapered to a point to facilitate insertion of the tines into the ground. Suitable ports 28 (Figure 6) are provided on the tapered portion of the tines. These ports serve to allow the mixture injected into the tines to flow out into the soil. The upper end of the tines forms a seal with the body 12 whereby leakage is prevented.

A liquid chamber 33 is formed in the body 12. A suitable connector 34 is secured to the body and provides means for connecting an external liquid source to the chamber 33. The connector 34 illustrated is a hose connector and a suitable hose 36 is attached thereto by means of a coupling 37.

The liquid jet 38, mixing chamber 39, and fluid passage 40 form a jet siphon or pump. The liquid for operating the jet siphon is supplied under pressure from the chamber 33. I prefer to use tap water for operating the jet siphon. As is well known, a siphon of this type serves to aspirate fluid into the mixing chamber 39 through passage 40. Although a single jet siphon may be employed to feed a plurality of tines, I prefer to employ one jet siphon for each tine. The liquid and fluid mixture in the chamber 39 travels downward through the tapered portion 41 into the inside 42 of the tines.

In the example illustrated, the passage 40 is formed as part of the threaded bore 44. A nut 46 which has an opening 47 therein is accommodated in the threaded bore. Interposed between the shoulder 48 and the nut 46 is a diaphragm 49. The diaphragm is cut 51 to form a flap 52. This flap acts as a check valve which prevents the flow of liquid out of the chamber 39, yet allows entrance of fluid into the chamber. It is, of course, to be understood that the valve shown is illustrative only, and that other suitable check valves may be employed.

As illustrated, passage 40 communicates with the surrounding air through the opening 47 formed in the nut 46. A water hose is connected to the chamber 33 and provides water under pressure thereto. The jet siphon draws in air which is mixed with the jet stream of water in the chamber 39 and flows through the tines into the soil where it serves to aerate the same. The pressure of the mixture serves to cause fissures 53 (Figure 5) which loosen the soil and into which the air and water mixture flows.

In operation, the amount of fluid siphoned varies not only according to the cross-sectional area of the liquid jet 38 and the initial pressure of the liquid in the chamber 33, but also according to the back pressure. The back pressure is caused by the restriction of the ports 28 by the surrounding soil. When the tines are initially inserted into hard, compacted soil, the back pressure is high, and were it not for the check valves associated with the passage 40, the liquid would flow out through the passage. Full line liquid pressure is then available to loosen the soil. As the soil is loosened by the liquid pressure, the back pressure diminishes to a point where fluid is siphoned and mixed with the liquid.

It is, of course, apparent that by connecting a tube to the bore 44 the reduced pressure in the chamber 39 may be used to aspirate fertilizer or soil conditioner which is then mixed with water and flows into the soil through the ports.

Referring to Figure 5, the tines are shown inserted into the ground below the surface of the soil. It is seen that the soil a considerable distance below the surface is being conditioned by the tool.

Although a specific embodiment of this invention has been shown and described, it will be understood that it is merely illustrative and that various modifications may be made therein without departing from the scope and spirit of this invention.

I claim:

1. Soil conditioning apparatus comprising a main body, a handle attached to the upper portion of said body, a liquid chamber formed in said body, means for connecting said chamber to an external liquid source, a liquid jet passage formed in said body and communicating with said chamber and forming a jet stream, a mixing chamber having a greater diameter than said jet passage formed in said body and communicating with said jet passage and serving to receive said jet stream, a passage formed in said body and communicating between said mixing chamber and the exterior of the body, a check valve disposed in said last named passage, said jet passage, mixing chamber and passage forming a jet siphon serving to aspirate fluid into said jet stream to form a mixture, a hollow tine secured to the bottom portion of said body and adapted to receive said mixture, the end portions of said tine being tapered whereby it may be easily inserted into the ground, and at least a port formed in said tine to inject the mixture into the soil.

2. Soil conditioning apparatus comprising an elongated main body, a handle attached to the upper end of said body, a cylindrical liquid chamber formed in the said body and having its axis extending at right angles to the axis of the body, a hose connector extending outwardly from the side of said body and attached to the same for connecting said liquid chamber to an external liquid source, a liquid jet passage formed in said body and communicating with said chamber to form a jet stream, a mixing chamber having a greater diameter than said jet passage and coaxial therewith formed in said body communicating with the same and serving to receive the jet stream, a passage formed in said body and communicating between said mixing chamber and the exterior of the body, a check valve disposed in said last named passage, said jet passage, mixing chamber and passage forming a jet siphon serving to aspirate fluid into said jet stream to form a mixture with the liquid from the liquid source, a hollow tine secured to the lower end of said elongated body and adapted to receive said mixture, the end portion of said tine being tapered whereby it may be easily inserted into the ground, and at least a port formed in said tine to inject the mixture into the soil.

3. Apparatus as in claim 2 wherein said liqid comprises water and said fluid aspirated into the soil is air whereby the soil is aerated a distance below the surface.

4. Apparatus as in claim 2 together with a tapered opening expanding in the direction of the tine connecting said mixing chambers to said tine.

5. Soil conditioning apparatus comprising a main body, a liquid chamber formed in said body, means connecting said chamber to an external liquid source, a jet passage formed in said body and communicating with said chamber and forming a jet stream, a mixing chamber having a greater diameter than said jet passage formed in said body and communicating with said jet passage and serving to receive said jet stream, a passage formed in said body and communicating between said mixing chamber and the exterior of the body, a check valve disposed in said last named passage, said jet passage, mixing chamber and passage forming a jet siphon serving to aspirate fluid into said jet stream to form a mixture, a tapered opening having its small end connected to the mixing chambers to receive said mixture therefrom, a hollow tine communicating with the large end of said opening, the end portion of said tine being tapered whereby it may be easily inserted in the soil, and at least one port formed in said tine to inject the mixture into the soil.

References Cited in the file of this patent

UNITED STATES PATENTS

| | | |
|---|---|---|
| 1,449,606 | Horner | Mar. 27, 1923 |
| 1,748,488 | McCabe | Feb. 25, 1930 |
| 1,755,445 | Irish | Apr. 22, 1930 |
| 1,769,266 | Lusier | July 1, 1930 |
| 2,302,799 | Peterson | Nov. 24, 1942 |
| 2,323,773 | Irish | July 6, 1943 |
| 2,766,975 | Herrod | Oct. 16, 1956 |
| 2,800,313 | Targosh et al. | July 23, 1957 |